United States Patent
Wilson et al.

(10) Patent No.: US 11,048,013 B2
(45) Date of Patent: Jun. 29, 2021

(54) MULTI-DIMENSIONAL DIELECTRIC LOGGING

(71) Applicant: Halliburton Energy Services, Inc., Houston, TX (US)

(72) Inventors: Glenn A. Wilson, Houston, TX (US); Wei-Bin Ewe, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 65 days.

(21) Appl. No.: 16/348,886

(22) PCT Filed: Jan. 5, 2017

(86) PCT No.: PCT/US2017/012343
§ 371 (c)(1),
(2) Date: May 10, 2019

(87) PCT Pub. No.: WO2018/128614
PCT Pub. Date: Jul. 12, 2018

(65) Prior Publication Data
US 2019/0271793 A1    Sep. 5, 2019

(51) Int. Cl.
*G01V 3/30* (2006.01)
*G01V 3/26* (2006.01)
*G01V 3/38* (2006.01)

(52) U.S. Cl.
CPC .............. *G01V 3/30* (2013.01); *G01V 3/26* (2013.01); *G01V 3/38* (2013.01)

(58) Field of Classification Search
CPC .............. G01V 3/30; G01V 3/26; G01V 3/38
See application file for complete search history.

(56) References Cited

U.S. PATENT DOCUMENTS

| | | | |
|---|---|---|---|
| 4,849,699 A * | 7/1989 | Gill | G01V 3/38 324/339 |
| 5,461,562 A | 10/1995 | Tabanou et al. | |
| 2003/0004646 A1 | 1/2003 | Haugland | |

(Continued)

FOREIGN PATENT DOCUMENTS

WO    2016111678 A1    7/2016

OTHER PUBLICATIONS

Electromagnetic Conductivity Imaging with an Iterative Born Inversion, IEEE transactions on geoscience and remote sensing, vol. 31, No. 4, Jul. 1993 David L. Alumbaugh and H. Frank Morrison (Year: 1993).*

(Continued)

*Primary Examiner* — Akm Zakaria
(74) *Attorney, Agent, or Firm* — Gilliam IP LLC

(57) ABSTRACT

A conductivity model is used for a logging tool and surrounding borehole and formation. The conductivity model is separable into a background conductivity model and an anomalous conductivity model for at least one of the formation and the tool. With the conductivity model, background electromagnetic fields and Green's functions corresponding to electromagnetic field signals at one or more receivers are computed for inversion of measured electromagnetic signals to determine adjustable parameters associated with anomalous conductivity. From the inversion, dielectric and other electromagnetic properties of the formation and borehole are determined.

18 Claims, 7 Drawing Sheets

(56) References Cited

U.S. PATENT DOCUMENTS

| | | | |
|---|---|---|---|
| 2009/0119040 A1* | 5/2009 | Zhdanov | A61B 5/417 702/65 |
| 2013/0046175 A1* | 2/2013 | Sumi | A61B 8/08 600/431 |
| 2013/0138346 A1* | 5/2013 | Mattsson | G01V 3/083 702/2 |
| 2016/0266269 A1 | 9/2016 | Wilson et al. | |
| 2016/0363686 A1 | 12/2016 | Kouchmeshky et al. | |
| 2018/0136356 A1 | 5/2018 | Wilson et al. | |

OTHER PUBLICATIONS

Zhdanov et al. "Fast 3D Imaging from a Single Borehole Using Tensor Induction Logging Data", petrophysics, vol. 45, No. 2 (Mar.-Apr. 2004); p. 167-178; 17 figures, Michael S. Zhdanov1, Efthimios Tartaras2, and Alexander Gribenko1 (Year: 2004).*

International Written Opinion, Application Serial No. PCT/US2017/012343, dated Sep. 21, 2017, 11 pages.

International Search Report, Application Serial No. PCT/US2017/012343, dated Sep. 21, 2017, 3 pages.

Bittar, et al., "A Modern Microwave Formation Evaluation Sensor and Its Applications in Reservoir Evaluation", Society of Petrophysicists and Well-Log Analysts, SPWLA 51st Annual Logging Symposium, Jun. 19-23, 2010, Perth, Australia, 10 pages.

Hizem, et al., "Dielectric Dispersion: A New Wireline Petrophysical Measurement", Society of Petroleum Engineers, SPE Annual Technical Conference and Exhibition, Sep. 21-24, 2008, Denver, Colorado, USA, 21 pages.

Zhdanov, "Regularization methods", Geophysical Inverse Theory and Regularization Problems, 1st Edition, Ch. 3.5, pp. 74-82; Elsevier, Amsterdam, 2002.

Zhdanov, "The regularization method in a linear inverse problem solution", Geophysical Inverse Theory and Regularization Problems, 1st Edition, Ch. 4.3, pp. 113-118; Elsevier, Amsterdam, 2002.

* cited by examiner

MULTI-DIMENSIONAL DIELECTRIC LOGGING

BACKGROUND

In borehole logging operations, dielectric logging tools can be used to measure various electrical properties of a borehole and/or surrounding formation. From the measured electrical properties, rock and fluid properties of interest, such as the porosity and water saturation of the formation, can then be derived. A dielectric logging tool generally includes one or more electromagnetic transmitters that act as sources of electromagnetic radiation, and one or more receivers that detect electromagnetic radiation scattered off the formation and/or materials in the borehole. The determination of the electrical properties usually involves modeling the borehole and formation, and determining parameters of the model by computational inversion, e.g., by iteratively comparing electric fields or voltages (or other electric response parameters) measured by the receivers with the electric fields or voltages at the receivers as computed based on the model, and adjusting the model parameters to reduce the discrepancy between computation and measurement. To render the inversion computationally tractable and/or allow the computation to be performed at least in part analytically, the model is often greatly simplified, e.g., by representing the electrical properties of the formation as homogenous (at least in the plane perpendicular to the borehole axis) and the logging tool as a magnetic dipole above a conductive ground plane.

DETAILED DESCRIPTION

Disclosed herein is an approach to modeling and inversion for dielectric logging that captures the dielectric logging tool and the borehole environment at greater complexity than conventional approaches, thereby providing more accurate determinations of the electrical properties and, thus, the rock and fluid properties of the borehole and formation. Specifically, in accordance with certain embodiments, the formation is modeled as generally heterogeneous in a plane perpendicular to the borehole, and the logging tool itself is modeled taking its three-dimensional shape and/or material properties into account. Hereinafter, any model of the tool and formation that represents the formation as non-homogenous and/or the tool with more detail than a magnetic dipole is referred to as a "complex model." (Similarly, a "complex model of the tool" refers to a tool that is modeled with more detail than a magnetic dipole.)

In accordance with various embodiments, the electromagnetic field in a domain of interest encompassing the locations of the transmitter(s) and receiver(s) is computed based on a complex model of the complex-valued (in the sense of having real and imaginary parts) conductivity over the domain of interest, expressed as the sum of a known background conductivity and an anomalous conductivity that includes unknown parameters. The background conductivity captures the conductivity of the modeled logging tool and the borehole, and a homogenous background conductivity of the formation. The anomalous conductivity captures the unknown deviation of the conductivity in the formation from the homogenous background. From the background conductivity, background electromagnetic fields and body-to-receiver Green's functions for the receivers of the tool can be computed, e.g., using a suitable numerical solver. Based on the computed background electromagnetic fields and Green's functions, the measured electromagnetic signals can then be inverted for the anomalous conductivity, and/or for quantities related to and derivable from the anomalous conductivity, such as sensitivities of the electromagnetic fields with respect to the conductivity, or rock and fluid properties. (By "inverting the electromagnetic signal for the anomalous conductivity" is hereby meant, consistently with the usage of the phrase by those of ordinary skill in the art, that the anomalous conductivity is computed from the signal using an inversion algorithm. The term "electromagnetic," as used herein, is intended to broadly encompass quantities (e.g., fields) having both electric and magnetic components as well as purely electric and purely magnetic quantities.)

In the following, various embodiments will be described in detail with reference to the accompanying drawings.

Figure 1:
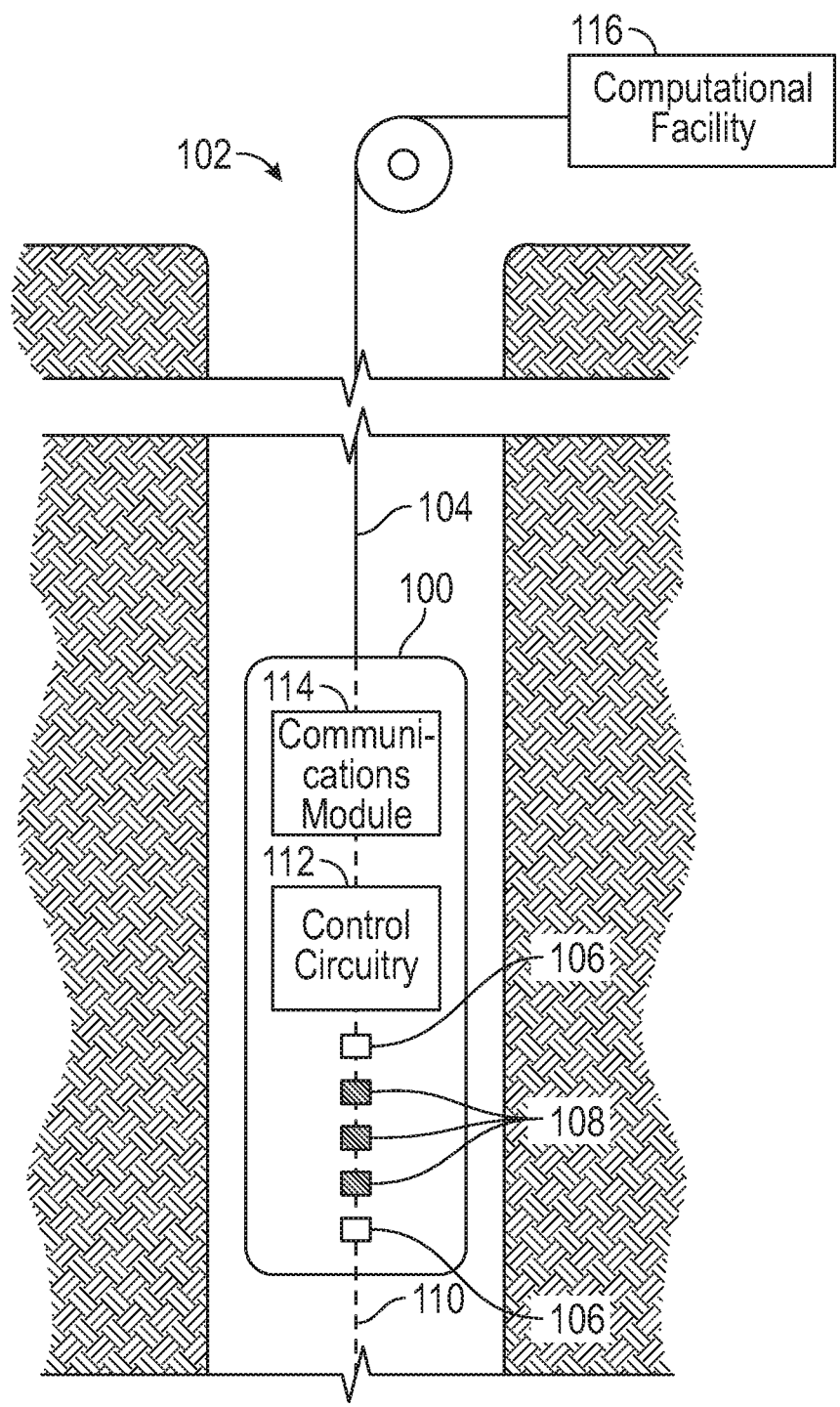
FIG. 1 is a diagram of an example dielectric logging tool deployed in a borehole on a wireline, in accordance with various embodiment.

FIG. 1 is a diagram of an example dielectric logging tool 100 deployed in a borehole 102 on a wireline 104, in accordance with various embodiment. In alternative embodiments, the tool 100 may be conveyed to the borehole 102 by slickline, coiled tubing, downhole tractor, or any other suitable means of conveyance. The tool 100 includes, in the depicted example embodiment, multiple electromagnetic transmitters 106 and multiple electromagnetic receivers 108 arranged parallel to the longitudinal tool axis 110, which generally coincides with the borehole axis. The tool 100 may further include control circuitry 112 for controlling the operation of the transmitters 106 and receivers 108, as well as a communications module 114 for exchanging data and/or control signals with a surface computational facility 116 via a wired or wireless connection. As the tool 100 is run through (e.g., lowered into or pulled out of) the borehole 102, it periodically transmits and receives electromagnetic waves to acquire electromagnetic measurements at various depths along the way. Data about these measurements (e.g., the measured signals themselves, or data extracted therefrom by downhole processing) is then sent uphole for processing by the surface computational facility 116. The surface computational facility 116 may be implemented with any suitable combination of hardware, firmware, and software (such as, for example, with dedicated electronic circuitry or a suitably programmed general-purpose computer having at least a processor and associated memory), and may include one or more machines. For example, in some embodiments, the computational functionality described herein below is provided by a single computer located at the well site, and in other embodiments, some or all of the computational functionality is provided by one or more remote computers connected to the well-site computer via a network. It is also possible, in principle, that some or all of the computational functionality is provided by processing circuitry integrated into the tool 100 itself (e.g., as part of circuitry 112), or, alternatively, that data is stored downhole in memory included in the tool 100 and processed only after the tool has been brought back up to the surface.

Figure 2:
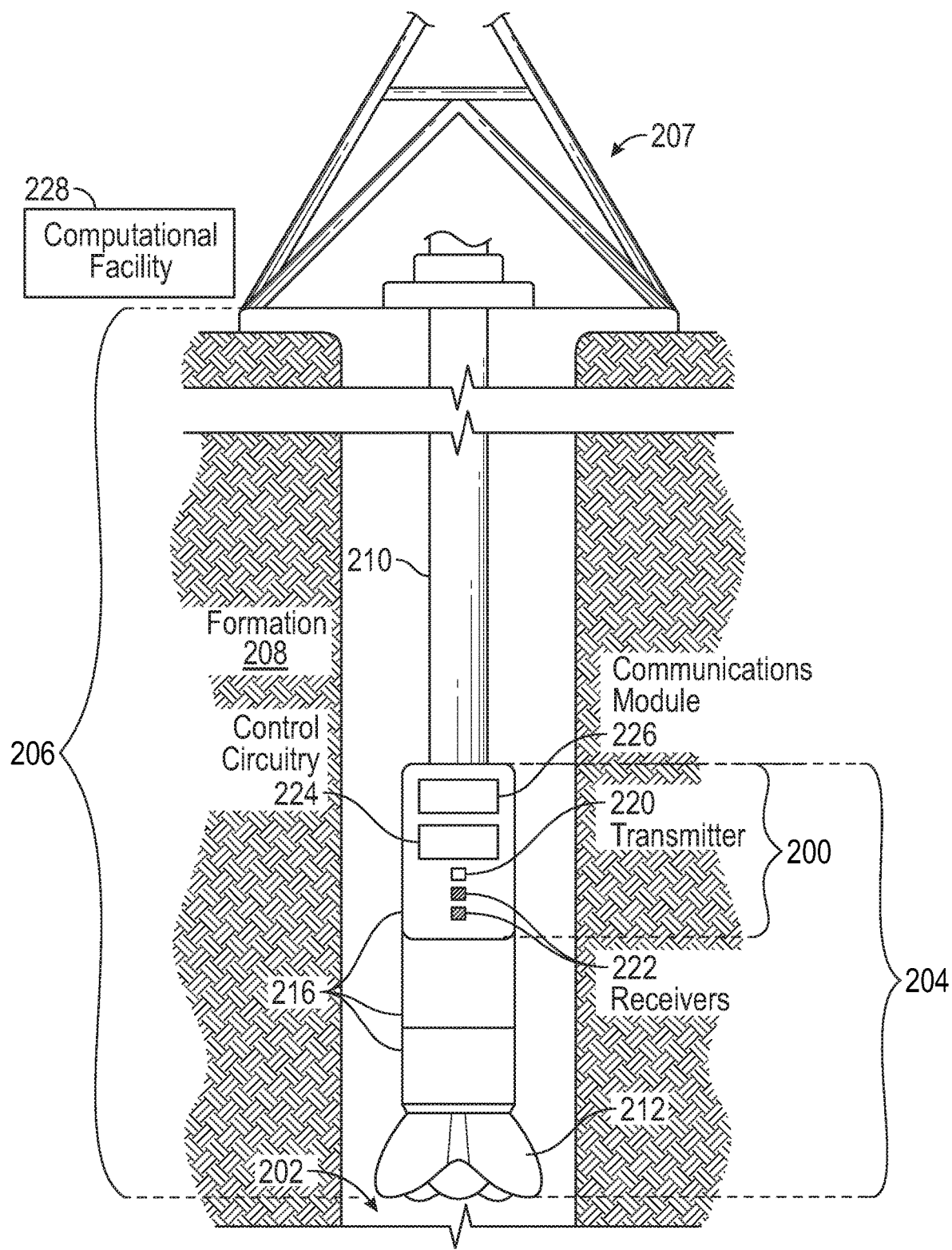
FIG. 2 is a diagram of an example dielectric logging tool deployed in a borehole as part of a drill string, in accordance with various embodiment.

FIG. 2 is a diagram of an example dielectric logging tool 200 deployed in a borehole 202 as part of the bottom hole assembly (BHA) 204 of a drill string 206, in accordance with various embodiment. The drill string 206 is supported by a drilling rig 207 located at the surface, and is used to drill the borehole 202 through the subsurface formations 208. The drill string 206 includes sections of drill pipe 210 and, mounted at the lower end of the drill pipe, the BHA 204. The BHA 204, in turn, includes the drill bit 212 for penetrating the surface and subsurface formations 208, one or more drill collars 216 to put weight on the drill bit 112, and usually a number of tools or instruments adapted for measurement-while-drilling (MWD) operations, such as, e.g., the dielectric logging tool 200. These tools or instruments may be housed in or otherwise integrated with the drill collars 216, or provided in separate "subs" of the drill string 206. As with wireline embodiments, the tool 200 may include one or more transmitters 220 and receivers 222, as well as associated circuitry 224 for controlling their operation and a communications module 226 for communicating, via a wired or wireless connection, with a surface computational facility 228 that is implemented with a suitable combination of hardware, firmware, and software and may include one or multiple machines.

Figure 3:
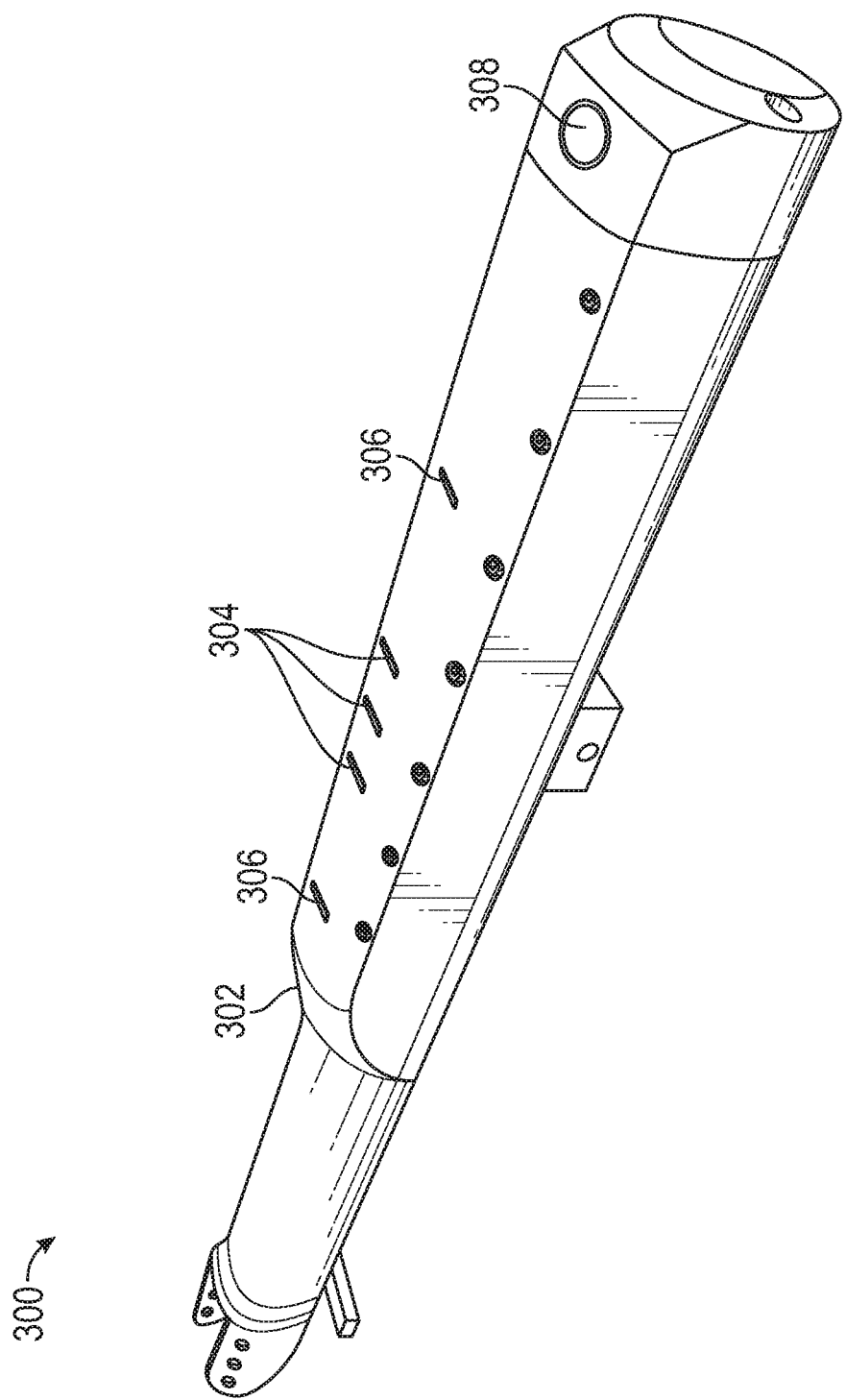
FIG. 3 is a perspective view of an example dielectric logging tool in accordance with various embodiments.

FIG. 3 is a perspective view of an example dielectric logging tool 300 in accordance with various embodiments. The tool 300 includes, embedded in a metallic tool body 302, three receivers 304 arranged in a line and between two transmitters 306, as well as a temperature sensor 308. Of course, the number of transmitters and receivers may vary for different embodiments. The tool 300 generally emits high-frequency electromagnetic radiation with the transmitters 306 and measures scattered radiation at the receivers 304. In accordance with one commercial implementation, the tool 300 operates at one to four frequencies over a range of 10 MHz to 3 GHz, and achieves a depth of investigation of about four inches into the formation. From the acquired signals, the electrical properties of the formation can be determined, which, in turn, allow recovering the water volume, rock texture, or other rock or fluid properties of the formation. In conventional electrical signal processing, the transmitters 304 and receivers 306 are usually modeled as magnetic dipoles above a conductive ground plane. This, however, is an oversimplification that ignores the true three-dimensional shape of the tool and the fact that, in reality, the transmitters and receivers are capacitive antennas, not magnetic dipoles. In accordance with some embodiments of the presently disclosed subject matter, the configuration of the tool 300 is captured more accurately, at a greater level of complexity, accounting, e.g., for the external shape of the metallic tool body 302 and/or the dielectric fills of the receivers 304 and transmitters 306. Such information about the tool configuration may be obtained, for instance, from engineering drawings of the tool 300.

Figure 4A:
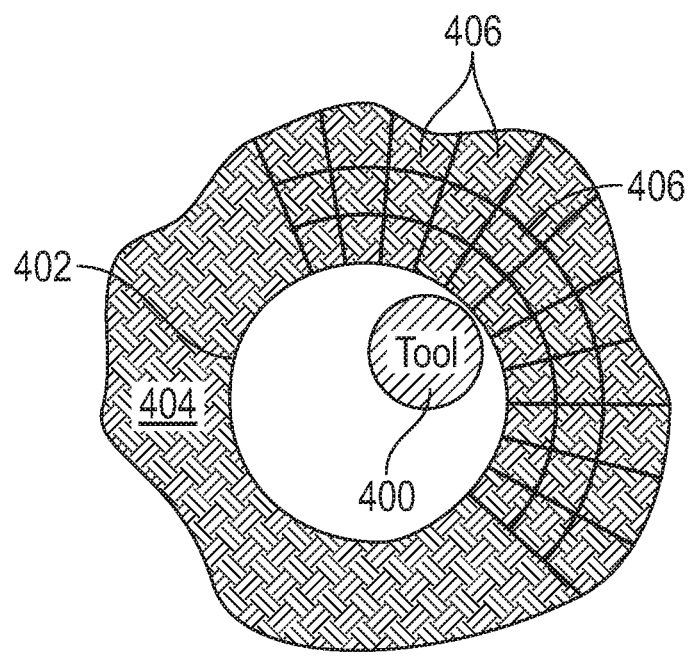
FIGS. 4A and 4B are schematic cross-sectional views of a dielectric logging tool disposed in a borehole, illustrating three-dimensional spatial discretization and two-dimensional spatial discretization, respectively, of the formation surrounding the borehole, in accordance with various embodiments.
Figure 4B:
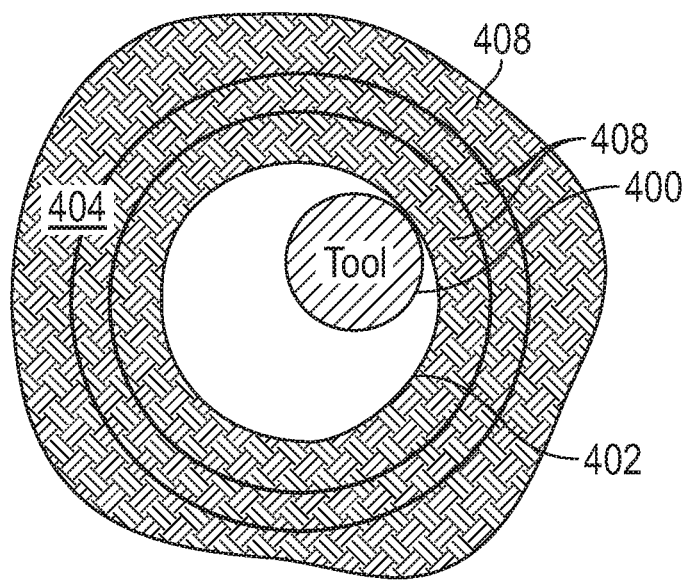

FIGS. 4A and 4B are schematic cross-sectional views of a dielectric logging tool (indicated by tool body 400) disposed in a borehole 402, illustrating spatial discretization of the formation 404 surrounding the borehole 402 in three or two dimensions, respectively, in accordance with various embodiments. The cross-sections are taken perpendicularly to the borehole axis (e.g., horizontally for a borehole that extends vertically into the ground). During dielectric logging, the electrical properties of the formation can generally be determined independently at each depth (herein taken to be along the direction of the borehole axis), accommodating a model in which they vary at least along that dimension. Within the plane perpendicular to the borehole axis, however, the formation properties are, in conventional models, generally assumed to be homogenous (and thus captured with a single parameter per depth for each type of property). In accordance with various embodiments of the present subject matter, by contrast, the formation is modeled as generally inhomogeneous in the plane perpendicular to the borehole axis. For example, as shown in FIG. 4A, the formation volume may be radially and azimuthally discretized, resulting, along with the discretization along the borehole axis, in three-dimensional spatial discretization (indicated by volume elements 406). For some applications, azimuthal discretization is not needed, and the formation volume is therefore discretized only in the radial direction, as illustrated by rings 408 in FIG. 4B, in addition to the direction along the borehole axis, resulting in overall two-dimensional discretization of the formation volume. In practice, the formation properties often vary in the radial direction due to invasion of the formation by borehole fluids such as drilling mud; allowing for inhomogeneity in the radial direction in the model facilitates capturing the resulting formation invasion profile. The fluid filling the borehole 402 can generally be adequately modeled as homogeneous. In general, the dimensionality of the conductivity model (e.g., whether the model is one-dimensional, two-dimensional, or three-dimensional) is based on the interpreter's prejudice and/or requirements for solving particular logging problems.

Figure 5:
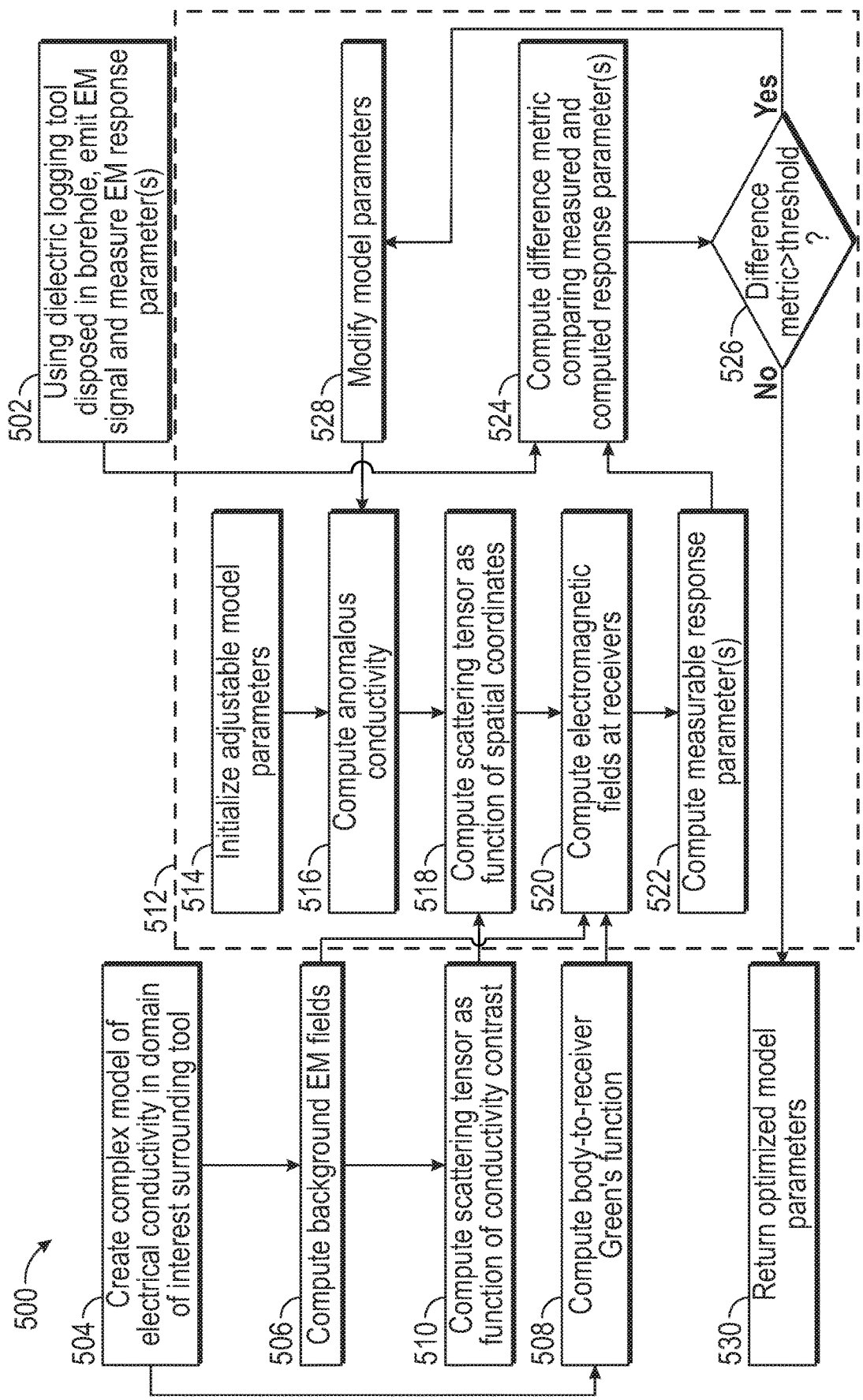
FIG. 5 is a flow chart of a dielectric logging method in accordance with various embodiments.

FIG. 5 is a flow chart of a dielectric logging method 500 in accordance with various embodiments. The method 500 involves using a dielectric logging tool (e.g., tool 100, 200, or 300) disposed in the borehole to emit electromagnetic waves towards the surrounding formation and measure electromagnetic response signals resulting from scattered electromagnetic waves with the (two or more) receivers of the tool (act 502). To acquire a log, this process is generally repeated at various depths within the borehole, either at discrete depth intervals or continuously as the tool moves through the borehole.

The method further includes creating, in act 504, a conductivity model—i.e., a model of the complex-valued electrical conductivity (which captures the electrical properties of the formation) as a function of spatial coordinates—for a domain of interest within the volume of investigation of the tool, the domain of interest surrounding and encompassing the tool and including a desired volume in the formation (herein also referred to as the "anomalous domain"), e.g., an annular volume reaching radially from the borehole wall to a certain depth of investigation. The modeled electrical conductivity (and, similarly, other modeled electrical quantities, such as electric fields or sensitivities) may be a piecewise continuous function of the spatial coordinates. For example, the domain of interest may be discretized into (e.g., tetrahedral or hexahedral) volume elements (e.g., as illustrated in FIG. 4A), which may be populated by discrete values (or, in more sophisticated embodiments, continuous analytical functions within each element). The conductivity model may reflect symmetries and related boundary conditions (e.g., cylindrical symmetry as shown in FIG. 4B), which may be exploited to reduce the simulation domain, without loss of accuracy, for improved computational efficiency.

In accordance with various embodiments, the conductivity model is separable, for purposes of the subsequent computations, into a background portion ($\hat{\sigma}_b(\vec{r})$), also the "background conductivity model") and an anomalous portion $\hat{\sigma}_a(\vec{r})$, also the "anomalous conductivity model"). The background conductivity model captures the known conductivity of the tool and borehole fluid and a fixed homogenous background conductivity level of the formation, while the anomalous conductivity model describes any deviation of the formation conductivity from the background conductivity level and depends on adjustable parameters that are to be determined by inversion from the measured electromagnetic signals. In accordance with various embodiments, the conductivity model is a complex model in the sense that the background portion includes a complex model of the tool and/or the anomalous portion is inhomogeneous.

With the conductivity model separated into background and anomalous portions, it follows from Maxwell's equations that the electromagnetic fields can likewise be separated into background and anomalous portions, the background electromagnetic fields being computed for the extraneous sources in the background conductivity model and the anomalous electromagnetic fields being computed for scattering currents in the anomalous conductivity model. In acts 506, 508 a numerical method is used to compute the background electromagnetic field and body-to-receiver Green's functions (explained in more detail below) from the background conductivity model. In some embodiments, the background electromagnetic field is not only computed for a single background conductivity model, but for a set of background conductivity models differing in their respective values of the homogenous background conductivity of the formation, which may be viewed as different "conductivity contrasts" relative to a particular selected background conductivity. The resulting library of background electromagnetic fields for the different conductivity contrasts may be used to evaluate a scattering tensor that relates background and anomalous electric fields, and determine its dependency on the conductivity contrast (act 510) (explained in more detail below). Alternatively to using the scattering tensor, it is also possible to compute body-to-body Green's functions for the volume of investigation in the formation.

In contrast to conventional modeling approaches for dielectric logging applications, where the background electromagnetic fields are computed analytically or semi-analytically to avoid both excessive discretization of the sources and numerical instabilities arising from insufficient discretization, use of a numerical method (such as, e.g., a finite-element, finite-difference, or integral-equation method, or a hybrid of two or more such methods) facilitates modeling the tool with greater complexity and avoiding the kind of oversimplification of the tool (e.g., as magnetic dipoles above a magnetic ground plane) upon which the use of analytical/semi-analytical methods is often contingent. Full-wave electromagnetic solvers suitable for performing the computations described herein are readily available in various academic and commercial software products, such as, e.g., Feko, Microwave Studio, and HFSS. Beneficially, the numerical methods can be formulated with an adaptive mesh algorithm that minimizes error.

With the modeled background electromagnetic fields, Green's functions, and scattering tensors computed in acts 504-510, the measurements taken in act 502 can be inverted for the anomalous conductivity of the formation and/or adjustable formation parameters (e.g., rock and fluid properties) on which it depends (acts 512). In more detail, the inversion involves initializing the adjustable model parameters (in act 514) and computing the anomalous conductivity $\hat{\sigma}_a(\vec{r})$ based thereon (act 516), determining the scattering tensor as a function of spatial coordinate based on the anomalous conductivity model in conjunction with the dependency of the scattering tensor on the conductivity contrast (act 518), and computing the total electromagnetic fields (including background and anomalous fields) at the receivers from the background electromagnetic fields, Green's functions, and scattering tensor (act 520). With a suitable transfer function, the computed electromagnetic fields may then be related to other measurable electromagnetic response parameters (such as, e.g., S-parameters) (act 522), for comparison with the measurements. (Alternatively, the measured electromagnetic response parameters may be converted to electrical fields for comparison with the computed electromagnetic fields.) A difference metric capturing the discrepancy between measured and computed response parameters is computed (act 524), and if the difference metric exceeds a specified threshold (as determined at 526), the adjustable model parameters are modified (act 528), and the computation of the anomalous conductivity and resulting electromagnetic fields and/or other measurable electromagnetic response parameters (acts 516-526) is repeated. The process continues iteratively until the computed and measured response parameters are consistent within the limit set by the threshold (i.e., the difference metric falls below the threshold). In this manner, the adjustable model parameters can be optimized; the optimized parameters are returned in act 530. Various optimization routines using different difference metrics or ways of updating the adjustable model parameters are known to those of ordinary skill in the art; one example method is gradient-based optimization.

The method 500 will now be explained in more detail in a frequency-domain formulation, i.e., for a single frequency of the electromagnetic signals emitted by the transmitter of the tool and measured at the receivers. It will be straightforward to those of ordinary skill in the art given the benefit of the present disclosure to extend the method to multiple frequencies, as a logical extension of partitioned vectors and matrices. Further, the following description includes equations that will, for the sake of clarity, be specific to electric quantities such as electric fields, electric Green's functions, etc. The method is, however, equally applicable to magnetic quantities (such as magnetic fields, magnetic Green's functions, etc.), and a person of ordinary skill in the art given the benefit of the instant disclosure will be readily able to develop the magnetic analog of the below equations.

The conductivity is generally a complex quantity:

$$\hat{\sigma}(\vec{r})=\hat{\sigma}'(\vec{r})+i\hat{\sigma}''(\vec{r}),$$

where the real part $\hat{\sigma}'$ is related to dispersion and loss, and the imaginary part $\hat{\sigma}''$ is related to the permittivity $\hat{\epsilon}(\vec{r})$ of the medium. Neglecting induced-polarization terms, the imaginary part of the complex conductivity has the form: $\hat{\sigma}''(\vec{r})=\omega\hat{\epsilon}(\vec{r})$, where $\omega$ is the angular frequency. Further, the conductivity is generally a second-rank tensor:

$$\hat{\sigma}(\vec{r}) = \begin{bmatrix} \sigma_{xx} & \sigma_{xy} & \sigma_{xz} \\ \sigma_{yx} & \sigma_{yy} & \sigma_{yz} \\ \sigma_{zx} & \sigma_{zy} & \sigma_{zz} \end{bmatrix},$$

which, due to energy considerations, is symmetric (i.e., $\sigma_{xy}=\sigma_{yx}$, $\sigma_{xz}=\sigma_{zx}$, $\sigma_{yz}=\sigma_{zy}$). The conductivity of the borehole fluid is usually isotropic (i.e., all tensor components are equal) and frequency-dependent, whereas the conductivity of the formation is generally anisotropic and frequency-dependent. The conductivity of the dielectric logging tool is generally isotropic and not frequency-dependent, but may be magnetic.

As mentioned above, the conductivity, $\hat{\sigma}(\vec{r})$, is separable into a background conductivity, $\hat{\sigma}_b(\vec{r})$, and an anomalous conductivity, $\hat{\sigma}_a(\vec{r})$:

$$\hat{\sigma}(\vec{r})=\hat{\sigma}_b(\vec{r})+\hat{\sigma}_a(\vec{r}).$$

As a result, the electric field, $\vec{E}(\vec{r})$, can be expressed as the sum of a background electric field, $\vec{E}_b(\vec{r})$, and an anomalous electric field, $\vec{E}_a(\vec{r})$:

$$\vec{E}(\vec{r})=\vec{E}_b(\vec{r})+\vec{E}_a(\vec{r}).$$

Figure 6A:
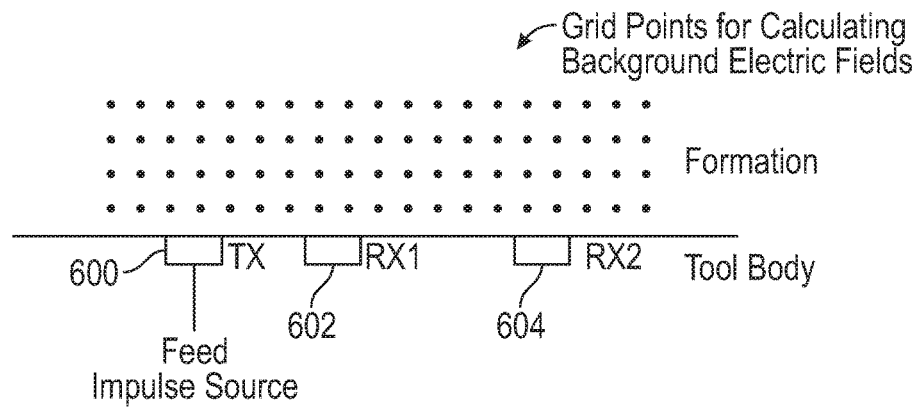
FIGS. 6A-6C are schematic diagrams of a dielectric logging tool with one transmitter and two receivers and an adjacent domain, illustrating the computation of the background electric field, the Green's function for an impulse source at the first receiver, and the Green's function for an impulse source at the second receiver, respectively, in accordance with various embodiments.
Figure 6B:
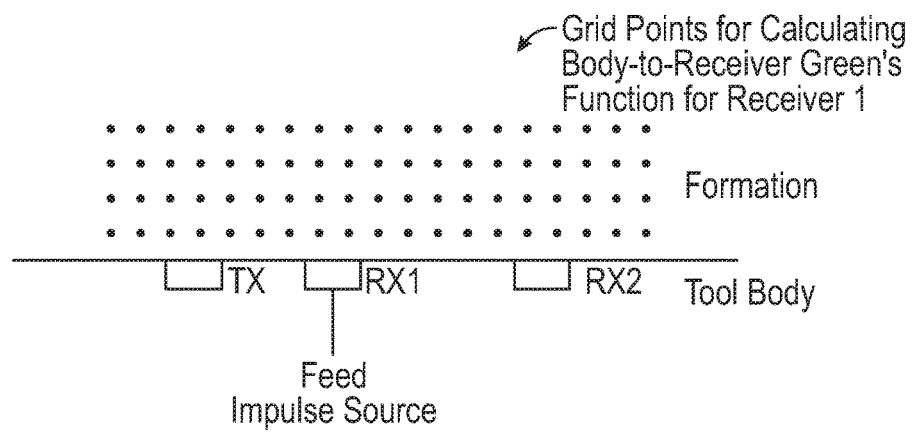
Figure 6C:
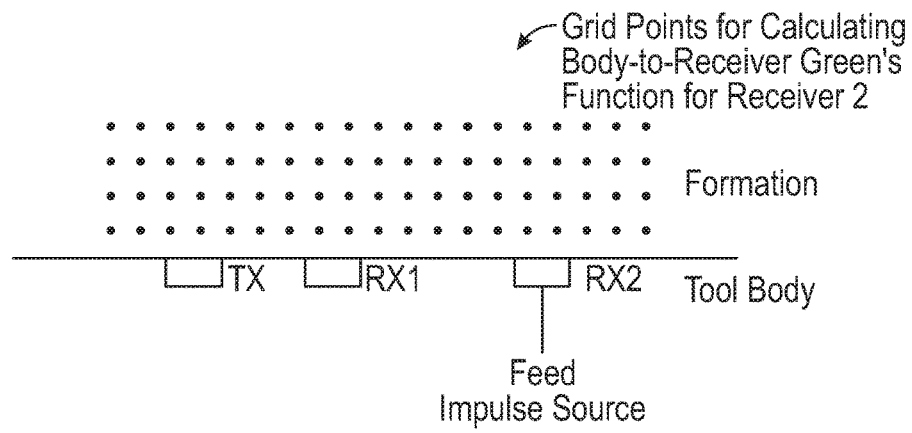

FIGS. 6A-6C illustrate the computation of the background electric field and electric Green's functions for a dielectric logging tool with one transmitter and two receivers. With reference to FIG. 6A, to compute the background electric field $\vec{E}_b(\vec{r})$, an impulse source is applied at the transmitter 600. Electromagnetic-wave propagation in the tool, borehole fluid and formation is numerically simulated to determine the resulting electric fields $E_b^1(\vec{r}_1)$ and $E_b^2(\vec{r}_2)$ measured at the two receivers 602, 604, as well as the triaxial components (e.g., radial, azimuthal, and vertical components in cylindrical coordinates, or x, y, and z components in Cartesian coordinates) of the background electric field $\vec{E}_b(\vec{r})$ at discrete points (e.g., as shown, the grid points of a regular grid) in the anomalous domain within the formation. With reference to FIG. 6B, to compute the body-to-receiver Green's function of the first receiver (receiver 602), an impulse source is applied at that first receiver 602. The triaxial components of the resulting electric fields are computed at the same discrete points in the formation as used for the computation of the background electric fields in FIG. 6A, and are referred to as the body-to-receiver Green's functions for the first receiver 602, $\vec{G}_1(\vec{r})$. From reciprocity considerations, it follows that the impulse source applied at the first receiver 602 is equal to the electric field that would be measured as a result of the Green's function (viewed as a source field) integrated over the volume of investigation within the formation. Similarly, with reference to FIG. 6C, to compute the body-to-receiver Green's function of the second receiver (receiver 604), an impulse source is applied at that second receiver 604. The triaxial components of the resulting electric fields are computed at the same discrete points in the formation, and are referred to as the body-to-receiver Green's functions for the second receiver 604, $\vec{G}_2(\vec{r})$. For dielectric logging tools with more than two receivers, additional respective body-to-receiver Green's functions can be computed in the same manner.

The background electric fields and Green's functions may be computed (by forward simulation) on a relatively fine grid, using the grid points (corresponding to the positions where the electric fields and Green's functions are evaluated) as points of Gaussian quadrature for numerically evaluating volume integrals. Alternatively, the background electric fields and Green's functions may be initially computed (by forward simulation) on a relatively coarse mesh, and then interpolated, e.g., by polynomials or splines, to a finer grid of points of Gaussian quadrature for numerically evaluating volume integrals.

In various embodiments, the background electric fields and Green's functions for multiple background conductivity models, differing in the model of the tool and/or the fixed homogenous background conductivity level of the formation, are precomputed, stored, and interrogated via a look-up table or interpolation function (e.g., splines) using an appropriate numerical solver. For a given model, the corresponding background electric fields and Green's functions can then be used in computing the anomalous electric field from the volume integral equation:

$$\vec{E}_a(\vec{r}')=\int_V \hat{G}(\vec{r}',\vec{r})\cdot\hat{\sigma}_a(\vec{r})[\vec{E}_b(\vec{r})+\vec{E}_a(\vec{r})]d^3r,$$

where V is the anomalous domain. (Outside the anomalous domain, $\hat{\sigma}_a(\vec{r})$ is zero.) This equation can, in principle, be solved in two steps: by first evaluating the anomalous electric fields inside the anomalous domain using the body-to-body Green's functions $\hat{G}(\vec{r}',\vec{r})$ ($\vec{r}'$, $\vec{r} \in V$) which are generally tensor quantities, and then evaluating the anomalous electric fields $E_a^k(\vec{r}_k)$ at the positions $\vec{r}_k$ of the receivers k (k=1 . . . N for N receivers), using the body-to-receiver Green's functions $\hat{G}_k(\vec{r}_k,\vec{r})$:

$$\vec{E}_a^k(\vec{r}_k)=\int_V \hat{G}(\vec{r}_k,\vec{r})\cdot\hat{\sigma}_a(\vec{r})[\vec{E}_b(\vec{r})+\vec{E}_a(\vec{r})]d^3r.$$

Alternatively, in accordance with various embodiments, the evaluation of the body-to-body Green's functions can be avoided by using the following linear relationship between the background electric fields $\vec{E}_b(\vec{r})$ and anomalous electric fields $\vec{E}_a(\vec{r})$:

$$\vec{E}_a(\vec{r})=\hat{\lambda}(\vec{r})\vec{E}_b(\vec{r}),$$

where $\hat{\lambda}(\vec{r})$ is the scattering tensor:

$$\hat{\lambda}(\vec{r}) = \begin{bmatrix} \lambda_{xx} & \lambda_{xy} & \lambda_{xz} \\ \lambda_{yx} & \lambda_{yy} & \lambda_{yz} \\ \lambda_{zx} & \lambda_{zy} & \lambda_{zz} \end{bmatrix}.$$

Various linearized (e.g., localized nonlinear, quasi-linear, quasi-analytical, etc.) approximations of the scattering tensor that provide varying degrees of accuracy have been developed.

In some embodiments, the scattering tensor is evaluated for each grid point (or corresponding volume element) within the anomalous domain based on the conductivity contrast (i.e., difference) between two numerically evaluated background conductivity models, which can be interpreted as the anomalous conductivity $\vec{E}_a(\vec{r})$ relative to the background conductivity $\vec{E}_b(\vec{r})$ of one of the models. Using the above linear relationship, $\hat{\lambda}(\vec{r})$ can be obtained by minimizing $\|\hat{\lambda}(\vec{r})\vec{E}_b(\vec{r})-\vec{E}_a(\vec{r})\|$, where $\vec{E}_b(\vec{r})$ and $\vec{E}_a(\vec{r})$ are known ($\vec{E}_a(\vec{r})=\vec{E}_{b2}(\vec{r})-\vec{E}_b(\vec{r})$), and where different homogenous background conductivity models $\vec{E}_{b2}(\vec{r})$ generally apply at different points). Since the overall conductivity can be expressed with different background conductivity levels, the definition of the scattering tensor is to some extent arbitrary.

In some embodiments, the minimization $\|\hat{\lambda}(\vec{r})\vec{E}_b(\vec{r}) - \vec{E}_a(\vec{r})\| \to \min$ is used to solve for the full scattering tensor (with all nine elements), yielding the most accurate form of the scattering tensor. In other embodiments, the scattering tensor can be reduced to diagonal form:

$$\hat{\lambda}(\vec{r}) = \begin{bmatrix} \lambda_{xx} & 0 & 0 \\ 0 & \lambda_{yy} & 0 \\ 0 & 0 & \lambda_{zz} \end{bmatrix},$$

allowing the diagonal elements $\lambda_{jj}$ (j=x, y, z) to be calculated as:

$$\lambda_{jj}(\vec{r}) = \frac{E_{a,j}(\vec{r}) \cdot E_{b,j}^*(\vec{r})}{E_{b,j}(\vec{r}) \cdot E_{b,j}^*(\vec{r})},$$

where $E_{a,j}$ and $E_{b,j}$ denote the j-th Cartesian component of the electric fields $\vec{E}_a$ and $\vec{E}_b$, respectively, and * denotes the complex conjugate. In some embodiments, the scattering tensor can even be reduced to a scalar:

$$\hat{\lambda}(\vec{r}) = \lambda \begin{bmatrix} 1 & 0 & 0 \\ 0 & 1 & 0 \\ 0 & 0 & 1 \end{bmatrix} = \lambda I,$$

where I is the identity tensor.

The elements of the scattering tensor generally vary slowly with respect to conductivity contrast. Accordingly, they may be evaluated for a number of values of the conductivity contrast covering a range of conductivity contrasts, and then represented as an interpolation function (e.g., cubic spline) of conductivity contrasts. From this interpolation function, the scattering tensor elements for any given conductivity contrast (within the covered range) can be calculated.

With the scattering tensor thus computed, the electric fields measured at the receivers can be obtained from the integral equation:

$$\vec{E}^k(\vec{r}_k) = \vec{E}_b^k(\vec{r}_k) + \vec{E}_a^k(\vec{r}_k)$$
$$= \vec{E}_b^k(\vec{r}_k) + \int_V \hat{G}(\vec{r}_k, \vec{r}) \cdot \hat{\sigma}_a(\vec{r})[1 + \hat{\lambda}(\vec{r})]\vec{E}_b(\vec{r})d^3r.$$

Beneficially, the body-to-receiver Green's functions $\hat{G}(\vec{r}_k, \vec{r})$ and background electric fields $\vec{E}_b(\vec{r})$ are invariant to changes in the anomalous conductivity, and can therefore be precomputed. Further, using the scattering tensor (e.g., as approximated by an interpolation function of conductivity contrast), a solution accuracy comparable to that of the solution of the full integral equation can be attained, at least in some embodiments, while the (computationally expensive) evaluation of the body-to-body Green's functions is avoided.

In accordance with some embodiments, the electric fields at the receivers may be related by transfer functions $T_k$ for the receivers k (k=1 . . . N) to other measurable response parameters, such as, e.g., S-parameters $$S^k(\vec{r}) = T_k E^k(\vec{r}).$$

The transfer functions for the dielectric logging tool can be determined from electric field computations. For example, transfer functions may correspond to the inverse of the background electric fields, such that the resulting (complex-valued) S parameter reflects the relative amplitude and phase of the electrical field to the background electrical field.

With the response parameters as determined from the computational conductivity model, in a manner as described above, the measured response parameters can be inverted for adjustable parameters in the conductivity model, such as parameters describing the anomalous conductivity in the formation. From the anomalous conductivity, geophysical properties of the formation can, in turn, be determined, e.g., using a suitable rock-physics model. Alternatively, in accordance with various embodiments, the measured responses may be inverted directly for the geophysical properties (such as rock and fluid properties) of the formation (as described below), using the sensitivity of the electric (or, more generally, electromagnetic) fields with respect to these properties.

The sensitivities (or, mathematically speaking, Frechet derivatives or Jacobian) of the electric fields to changes in the conductivity are given by the differential equation:

$$\frac{\partial E^k(\vec{r}_k)}{\partial \hat{\sigma}_a(\vec{r})} = \int_V \hat{G}(\vec{r}_k, \vec{r}) \cdot [1 + \hat{\lambda}(\vec{r})]\vec{E}_b(\vec{r})d^3r + \int_V \hat{G}(\vec{r}_k, \vec{r}) \cdot \hat{\sigma}_a(\vec{r}) \frac{\partial \hat{\lambda}(\vec{r})}{\partial \hat{\sigma}_a(\vec{r})} \vec{E}_b(\vec{r})d^3r,$$

where $$\frac{\partial \hat{\lambda}(\vec{r})}{\partial \hat{\sigma}_a(\vec{r})}$$

can be analytically evaluated from the cubic spline representation of the scattering tensor elements. The sensitivities can be assembled into an N×M sensitivity matrix $\hat{J}$ (with N being the number of receivers and M being the number adjustable model parameters), which has the elements:

$$J_{k,j} = \frac{\partial E^k(\vec{r}_k)}{\partial \hat{\sigma}_a^j},$$

With the anomalous conductivity expressed (under neglect of induced-polarization terms and assumption of isotropy as:

$$\hat{\sigma}_a(\vec{r}) = [\sigma_a(\vec{r}) + i\omega\epsilon_a(\vec{r})]I,$$

the partial derivatives of the complex conductivity with respect to the adjustable electrical parameters of the model are:

$$\frac{\partial \hat{\sigma}_a(\vec{r})}{\partial \sigma_a(\vec{r})} = 1 \text{ and } \frac{\partial \hat{\sigma}_a(\vec{r})}{\partial \epsilon_a(\vec{r})} = i\omega.$$

The sensitivities with respect to conductivity and permittivity can be obtained via the chain rule:

$$\frac{\partial E^k(\vec{r}_k)}{\partial \sigma_a(\vec{r})} = \frac{\partial \hat{\sigma}_a(\vec{r})}{\partial \sigma_a(\vec{r})} \cdot \frac{\partial E^k(\vec{r}_k)}{\partial \hat{\sigma}_a(\vec{r})} = \frac{\partial E^k(\vec{r}_k)}{\partial \hat{\sigma}_a(\vec{r})}, \text{ and}$$

$$\frac{\partial E^k(\vec{r}_k)}{\partial \epsilon_a(\vec{r})} = \frac{\partial \hat{\sigma}_a(\vec{r})}{\partial \epsilon_a(\vec{r})} \cdot \frac{\partial E^k(\vec{r}_k)}{\partial \hat{\sigma}_a(\vec{r})} = i\omega \frac{\partial E^k(\vec{r}_k)}{\partial \hat{\sigma}_a(\vec{r})}.$$

Similarly, other electrical parameters, e.g., various induced-polarization parameters, can be obtained via analytic expressions such as the Cole-Cole model and its variants. It is noted that magnetic analogs of the above electric sensitivities can be derived for the magnetic fields with body-to-receiver magnetic Green's functions.

Furthermore, based on analytical expressions for rock physics models that relate electric parameters such as conductivity and permittivity to rock and fluid properties (e.g., Archie's law, complex refractive index method (CRIM), effective medium theory, etc.), sensitivities of the electric (or, more generally, electromagnetic) fields to changes in these rock and fluid properties can be obtained. Consider, as one non-limiting example, the empirically derived Archie's law, according to which the effective (scalar) conductivity of a porous medium, such as a reservoir formation, is:

$$\sigma_e = \frac{1}{a}\sigma_f \Phi^m S_f^n,$$

where a is the tortuosity factor, $\sigma_f$ is the fluid conductivity, $\phi$ is the porosity, m is the cementation exponent, $S_f$ is the fluid saturation, and n is the saturation exponent, assuming that the rock matrix is non-conductive. Archie's law is widely accepted as being relevant for sandstone reservoirs without clay minerals. For dielectric logging, the cementation component m is of particular relevance. Differentiation of Archie's law with respect to the cementation component yields:

$$\frac{\partial \sigma_e}{\partial m} = \frac{1}{a}\sigma_f \ln\phi \Phi^m S_f^n.$$

Accordingly, the sensitivity of the electric fields with respect to the cementation exponent is:

$$\frac{\partial E^k(\vec{r}_k)}{\partial m(\vec{r})} = \frac{\partial \sigma_a(\vec{r})}{\partial m(\vec{r})} \cdot \frac{\partial E^k(\vec{r}_k)}{\partial \sigma_a(\vec{r})} = \frac{1}{a}\sigma_f \ln\phi \Phi^m S_f^n \frac{\partial E^k(\vec{r}_k)}{\partial \hat{\sigma}_a(\vec{r})}.$$

This equation along with similar equations for sensitivities with respect to other rock-physics parameters enable the direct inversion of electric field data for the cementation exponent and/or other rock-physics parameters, as the sensitivities can be used to select which rock-physics parameter is/are to be varied, and to determine in which direction and by how much to vary it/them, to reduce or minimize the difference between measured and computed electric fields (or other responses). The anomalous conductivity may then be re-computed with the adjusted rock-physics parameters for iterative further (and usually increasingly finer) parameter adjustments. Sensitivities can be evaluated with appropriate transfer functions for the fields or functions of the fields (e.g., phase and attenuation between two or more receivers). Given the linearity of the sensitivity matrix, the sensitivities may be summated in any manner (e.g., radially and/or azimuthally) to obtain sensitivities of the measured field to a larger region in the formation, such as annuli or segments of annuli about the borehole.

With modeling that provides electromagnetic responses and their sensitivities, electromagnetic data can be inverted for adjustable parameters in the model using any manner of regularized inversion. The modeling and inversion approaches described above can be applied to compensated or uncompensated dielectric measurements, and can be generalized to other antenna configurations and electromagnetic data types (they are not limited to S-parameters, but can also be applied, e.g., to port voltages or currents). Further, data from multiple logging depths can be inverted simultaneously so as to recover a more accurate formation model; such simultaneous inversion may employ a sliding window of the tool's sensitivity. The inversion can also be performed simultaneously for measurements taken at multiple frequencies, or can be applied to time-domain dielectric measurements. In addition, the disclosed methods can be incorporated in method of joint inversion of dielectric logging data with other resistivity data (e.g., microlog resistivity data).

The processing, modeling, and inversion methods described in this disclosure can be implemented in software programmed on serial and/or parallel processing architectures. The computational facility executing the software may be provided at the well site in a logging facility located above surface (or even integrated, in whole or in part, into the logging tool), or remotely from the well site with one or more computers connected to a well-site logging facility via a computer network. Beneficially, remote processing reduces the computational performance required by the well-site computer(s) while allowing all dielectric processing, modeling, and inversion (regardless whether one-, two-, or three-dimensional) to be performed effectively in real time, subject to network reliability.

Figure 7:
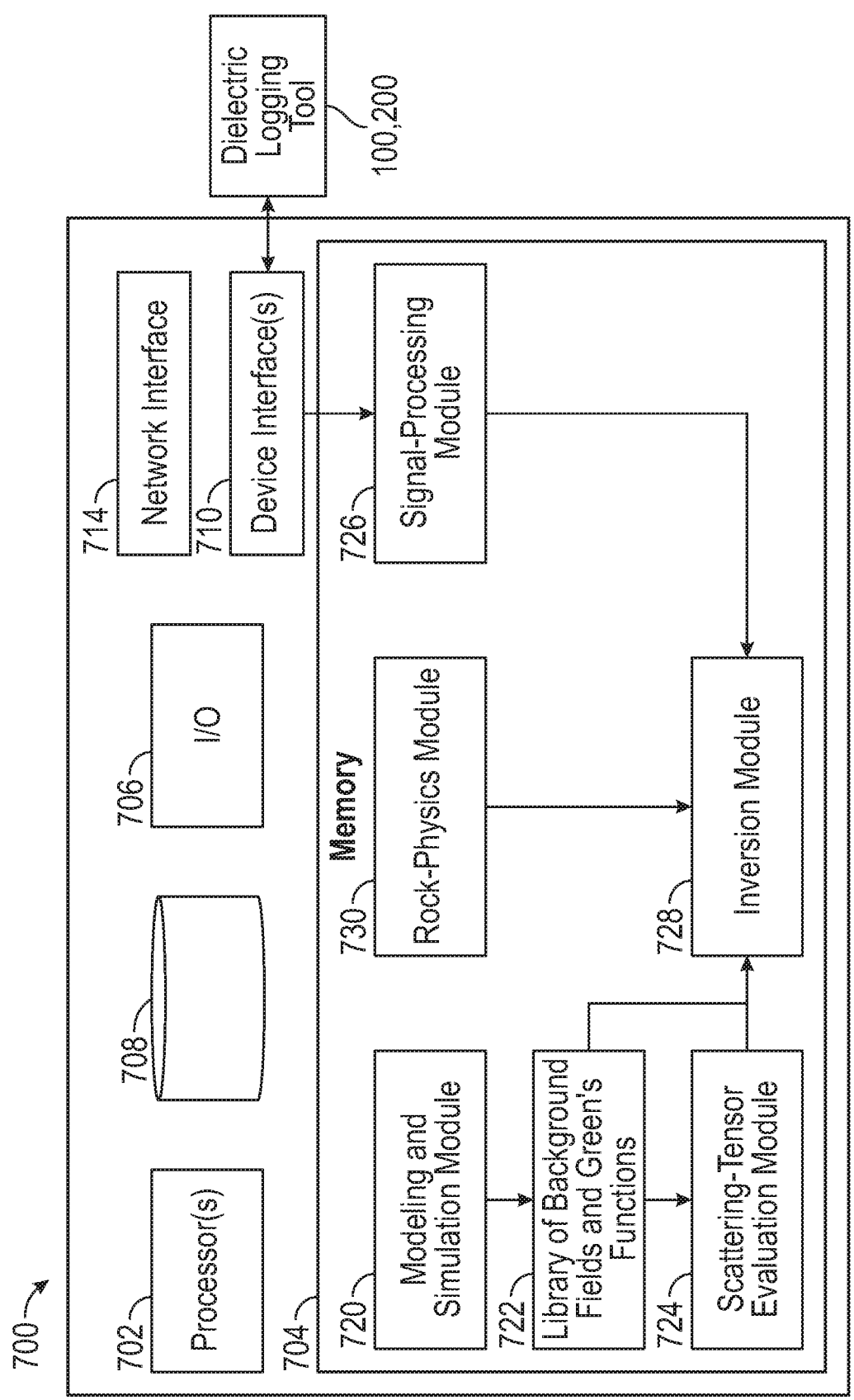
FIG. 7 is a block diagram of an example computational facility for processing dielectric logging data in accordance with various embodiments.

FIG. 7 is a block diagram of an example computational facility 700, implemented by a suitably programmed general-purpose computer, for processing dielectric logging data in accordance with various embodiments. The computational facility 700 includes one or more processors 702 (e.g., a conventional central processing unit (CPU), graphical processing unit, or other) configured to execute software programs stored in memory 704 (which may be, e.g., random-access memory (RAM), read-only memory (ROM), flash memory, etc.). In some embodiments, the computational facility 700 further includes user input/output devices 706 (e.g., a screen, keyboard, mouse, etc.), permanent data-storage devices 708 (including, e.g., solid-state, optical, and/or magnetic machine-readable media such as hard disks, CD-ROMs, DVD-ROMs, etc.), device interfaces 710 for communicating directly or indirectly with the dielectric logging tool (e.g., tool 100 or 200), and/or a network interface 714 that facilitates communication with other computer systems and/or data repositories. The various components of the computational facility 700 communicate with each other over a system bus (not shown). While shown as a single unit, the computational facility 700 may also be distributed over multiple machines connected to each other via a wired or wireless network such as a local network or the Internet.

The software programs stored in the memory 704 include processor-executable instructions for performing the methods described herein, and may be implemented in any of various programming languages, for example and without limitation, C, C++, Object C, Pascal, Basic, Fortran, Matlab, and Python. The instructions may be grouped into various functional modules. In accordance with the depicted embodiment, the modules include, for instance, a modeling and simulation module 720 with which a conductivity model of the dielectric logging tool, borehole, and formation can be defined and the background electromagnetic fields and Green's functions corresponding to impulse sources can be computed, resulting in a library 722 of background fields and Green's functions; a scattering-tensor evaluation module 724 for computing the elements of the scattering tensor as a function of conductivity contrast (using the library 722 of background fields); a signal-processing module 726 for deriving measured response parameters from the measured electromagnetic response signals; an inversion module 728 that optimizes adjustable model parameters based on the measured and computed response parameters; and a rock-physics module 730 for determining rock-texture and fluid (or other geophysical) properties of the formation, either as part of the inversion process or afterwards based on the dielectric formation properties. Of course, the computational functionality described herein can be grouped and organized in many different ways, the depicted grouping being just one example. Further, the various computational modules depicted in FIG. 7 need not all be part of the same software program or even stored on the same machine. Rather, certain groups of modules can operate independently of the others and provide data output that can be stored and subsequently provided as input to other modules. Further, as will be readily appreciated by those of ordinary skill in the art, software programs implementing the methods described herein (e.g., organized into functional modules as depicted in FIG. 7) may be stored, separately from any computational facility, in one or more non-volatile machine-readable media (such as, without limitation, solid-state, optical, or magnetic storage media), from which they may be loaded into (volatile) system memory of a computational facility for execution.

In general, the computational functionality described herein (optionally as organized into various functional modules) can be implemented with any suitable combination of hardware, firmware, and/or software. For example, a suitable computational facility may be permanently configured (e.g., with hardwired circuitry) or temporarily configured (e.g., programmed), or both in part, to implement the described functionality. A tangible entity configured, whether permanently and/or temporarily, to operate in a certain manner or to perform certain operations described herein, is herein termed a "hardware-implemented module" or "hardware module," and a hardware module using one or more processors is termed a "processor-implemented module." Hardware modules may include, for example, dedicated circuitry or logic that is permanently configured to perform certain operations, such as a field-programmable gate array (FPGA), application-specific integrated circuit (ASIC), or other special-purpose processor. A hardware module may also include programmable logic or circuitry, such as a general-purpose processor, that is temporarily configured by software to perform certain operations. Considering example embodiments in which hardware modules are temporarily configured, the hardware modules collectively implementing the described functionality need not all co-exist at the same time, but may be configured or instantiated at different times. For example, where a hardware module comprises a general-purpose processor configured by software to implement a special-purpose module, the general-purpose processor may be configured for respectively different special-purpose modules at different times.

The following numbered examples are illustrated embodiments: 1. A method comprising: using a dielectric logging tool disposed in a borehole, emitting an electromagnetic signal towards a formation surrounding the borehole and measuring electromagnetic response signals with two or more receivers of the tool; obtaining a conductivity model for a domain of interest, the conductivity model being separable into a background conductivity model and an anomalous conductivity model, the anomalous conductivity model being inhomogeneous; obtaining background electromagnetic fields and body-to-receiver Green's functions associated with the two or more receivers for the domain of interest, the background electromagnetic fields and body-to-receiver Green's functions being computed based on the background conductivity model; and inverting the measured electromagnetic response signals for one or more properties of the formation based at least in part on the anomalous conductivity model in conjunction with the background electromagnetic fields and body-to-receiver Green's functions. By "inverting the electromagnetic signals for properties of the formation" is hereby meant, consistently with the usage of the phrase by those of ordinary skill in the art, that the properties of the formation are computed from the signals using an inversion algorithm.

2. The method of example 1, wherein the background conductivity model comprises a complex model of the tool.

3. The method of example 2, wherein the complex model of the tool describes at least one of a three-dimensional shape of a body of the tool or material properties of dielectric fills within the tool.

4. The method of any of examples 1-3, further comprising obtaining a scattering tensor evaluated, based on a plurality of background electromagnetic fields, for a range of conductivity contrasts, and evaluating the scattering tensor for the domain of interest based on conductivity contrasts associated with the anomalous conductivity model, wherein the inverting is further based on the scattering tensor.

5. The method of any of examples 1-4, wherein obtaining the background electric fields and body-to-receiver Green's functions comprises computing the background electric fields and body-to-receiver Green's functions based on the background conductivity model.

6. The method of any of examples 1-5, wherein obtaining the background electric fields and body-to-receiver Green's functions comprises loading precomputed background electric fields and body-to-receiver Green's functions into memory.

7. The method of any of examples 1-6, wherein the one or more properties of the formation comprise at least one of electrical properties or rock properties.

8. The method of any of examples 1-7, wherein the anomalous conductivity model is radially symmetric about a longitudinal axis of the borehole.

9. The method of any of examples 1-8, wherein inverting the measured electromagnetic signals comprises computing sensitivities of electromagnetic fields at the receivers with respect to the anomalous conductivity.

10. A system comprising: a dielectric logging tool for disposal in a borehole, the tool comprising a transmitter to emit an electromagnetic signal towards a formation surrounding the borehole and two or more receivers to measure scattered electromagnetic signals received from the formation; and a computational facility to obtain background electromagnetic fields and body-to-receiver Green's functions for the two or more receivers over a domain of interest, the background electromagnetic fields and body-receiver Green's functions being based on a background conductivity model for the domain of interest, and invert the measured electromagnetic signals for one or more properties of the formation based at least in part on an inhomogeneous model of the anomalous conductivity in conjunction with the obtained background electromagnetic fields and body-to-receiver Green's functions.

11. The system of example 10, wherein the background conductivity model comprises a complex model of the tool.

12. The system of example 10 or example 11, wherein the computational facility is further to: obtain a scattering tensor evaluated, based on a plurality of background electromagnetic fields, for a range of conductivity contrasts; evaluate the scattering tensor for the domain of interest based on conductivity contrasts associated with the model of the anomalous conductivity; and base the inverting further on the scattering tensor.

13. The system of any of examples 10-12, wherein the computational facility is to obtain the background electric fields and body-to-receiver Green's functions by computation.

14. The system of any of examples 10-13, wherein the computational facility comprises a computer-readable medium storing precomputed background electric fields and body-to-receiver Green's functions.

15. A computer-readable medium storing instructions for execution by one or more processors of a computer, the instructions, when executed, causing the computer to: obtain scattered electromagnetic signals measured with two or more receivers of a dielectric logging tool disposed in a borehole upon emission of an electromagnetic signal towards a formation surrounding the borehole; obtain background electromagnetic fields and body-to-receiver Green's functions for the two or more receivers over a domain of interest, the background electromagnetic fields and body-receiver Green's functions being based on a background conductivity model; and invert the measured electromagnetic signals for one or more properties of the formation based at least in part on an inhomogeneous model of the anomalous conductivity in conjunction with the obtained background electromagnetic fields and body-to-receiver Green's functions.

16. The computer-readable medium of example 15, wherein the background conductivity model comprises a complex model of the tool.

17. The computer-readable medium of example 15 of example 16, wherein the instructions further cause the computer to: obtain a scattering tensor evaluated, based on a plurality of background electromagnetic fields, for a range of conductivity contrasts; evaluate the scattering tensor for the domain of interest based on conductivity contrasts associated with the anomalous conductivity model; and base the inverting further on the scattering tensor.

18. The computer-readable medium of any of examples 15-17, wherein the instructions cause the computer to obtain the background electric fields and body-to-receiver Green's functions by computation.

19. The computer-readable medium of any of examples 15-18, wherein the one or more properties of the formation comprise at least one of electrical properties or rock properties.

20. The computer-readable medium of any of examples 15-19, wherein the instructions cause the computer, when inverting the measured electromagnetic signals, to compute sensitivities of electromagnetic fields at the receivers with respect to the anomalous conductivity.

Many variations may be made in the system, devices, machine-readable media, and techniques described and illustrated herein without departing from the scope of the inventive subject matter. Accordingly, the described embodiments are not intended to limit the scope of the inventive subject matter. Rather, the scope of the inventive subject matter is to be determined by the scope of the following claims and all additional claims supported by the present disclosure, and all equivalents of such claims.

What is claimed is:

1. A method comprising:
generating a complex conductivity model, wherein the complex conductivity model is separable into a homogeneous background conductivity model and an inhomogeneous anomalous conductivity model;
determining background electromagnetic fields and body-to-receiver Green's functions associated with each of two or more receivers of a dielectric logging tool based on the homogeneous background conductivity model; and
determining a scattering tensor, wherein the scattering tensor relates the background electromagnetic fields to at least of a conductivity contrast and an anomalous electric field, wherein the conductivity contrast is a difference in conductivity between homogeneous background conductivity for the homogeneous background conductivity model and a second homogeneous background conductivity model; and
determining one or more properties of a formation based, at least in part, on received electromagnetic response signals, the background electromagnetic fields, the body-to-receiver Green's functions, the scattering tensor, and the inhomogeneous anomalous conductivity model,
wherein the received electromagnetic response signals comprise response signals measured at the two or more receivers of the dielectric logging tool in response to electromagnetic signals emitted towards the formation.

2. The method of claim 1, wherein the complex conductivity model comprises a complex conductivity model of the dielectric logging tool that describes at least one of a three-dimensional shape of the dielectric logging tool, material properties of the dielectric logging tool, dielectric fill of the one or more receivers, and dielectric fill of a transmitter antenna of the dielectric logging tool.

3. The method of claim 1, wherein determining the background electromagnetic fields and the body-to-receiver Green's functions comprises computing the background electric fields and the body-to-receiver Green's functions based on the homogeneous background conductivity model.

4. The method of claim 1, wherein determining the background electromagnetic fields and the body-to-receiver Green's functions comprises selecting precomputed background electric fields and precomputed body-to-receiver Green's functions.

5. The method of claim 1, wherein the one or more properties of the formation comprise at least one of electrical properties, geophysical properties, fluid properties, and rock properties.

6. The method of claim 1, wherein the inhomogeneous anomalous conductivity model of the formation is radially symmetric about a longitudinal axis of a borehole.

7. The method of claim 1, wherein determining one or more properties of the formation comprises determining at least one sensitivity with respect to an inhomogeneous anomalous conductivity.

8. A system comprising:
a dielectric logging tool comprising a transmitter and two or more receivers; and
a computational facility comprising,
a processor, and
processor-executable instructions, the processor-executable instructions executable by the processor to cause the system to,
obtain a complex conductivity model corresponding to at least one of a formation and the dielectric logging tool, wherein the complex conductivity model is separable into a homogeneous background conductivity model and an inhomogeneous anomalous conductivity model,
determine background electromagnetic fields and body-to-receiver Green's functions for each of the two or more receivers based on the homogeneous background conductivity model,
determine a scattering tensor, wherein the scattering tensor relates the background electromagnetic fields to at least one of a conductivity contrast and an anomalous electric field, wherein the conductivity contrast is a difference between homogeneous background conductivity for the homogeneous background conductivity model and a second homogeneous background conductivity model; and
determine one or more properties of the formation based, at least in part, on signals received by the two or more receivers, the background electromagnetic fields, the body-to-receiver Green's functions, the scattering tensor, and the inhomogeneous anomalous conductivity model.

9. The system of claim 8, wherein the processor-executable instructions to determine the background electromagnetic fields and the body-to-receiver Green's functions comprise processor-executable instructions to determine the background electromagnetic fields and the body-to-receiver Green's functions by computation.

10. The system of claim 8, wherein the processor-executable instructions to determine the background electromagnetic fields and the body-to-receiver Green's functions comprise processor-executable instructions to retrieve precomputed background electromagnetic fields and precomputed body-to-receiver Green's functions.

11. A computer-readable medium storing instructions for execution by one or more processors of a computer, the instructions, when executed, causing the computer to:
obtain electromagnetic signals measured with two or more receivers of a dielectric logging tool, wherein the obtained electromagnetic signals comprise signals measured in response to emission of an electromagnetic signal towards a formation;
determine background electromagnetic fields and body-to-receiver Green's functions for each of the two or more receivers, wherein the background electromagnetic fields and the body-to-receiver Green's functions are based on a homogeneous background conductivity model;
determine a scattering tensor, wherein the scattering tensor relates the background electromagnetic fields to at least one of a conductivity contrast and an anomalous electric field; and
determine one or more properties of the formation based at least in part on the obtained electromagnetic signals, the determined background electromagnetic fields, the determined body-to-receiver Green's functions, the scattering tensor, and an inhomogeneous anomalous conductivity model.

12. The computer-readable medium of claim 11, wherein the instructions to determine the background electromagnetic fields and the body-to-receiver Green's functions comprise instructions to cause the computer to calculate the background electromagnetic fields and the body-to-receiver Green's functions.

13. The computer-readable medium of claim 11, wherein the one or more properties of the formation comprise at least one of electrical properties, geophysical properties, fluid properties and rock properties.

14. The computer-readable medium of claim 11, wherein the instructions to determine the one or more properties of the formation further comprise instructions to determine at least one sensitivity with respect to an inhomogeneous anomalous conductivity.

15. The method of claim 1, wherein determining the one or more properties of the formation comprises inverting the received electromagnetic response signals based, at least in part, on the background electromagnetic fields, the body-to-receiver Green's functions, and the inhomogeneous anomalous conductivity model.

16. The method of claim 1, wherein determining the one or more properties of the formation comprises determining an inhomogeneous anomalous conductivity.

17. The system of claim 8, wherein the processor-executable instructions to determine the one or more properties of the formation comprise processor-executable instructions to invert the signals received by the two or more receivers based, at least in part, on the background electromagnetic fields, the body-to-receiver Green's functions, and the inhomogeneous anomalous conductivity model.

18. The computer-readable medium of claim 11, wherein the instructions to determine the one or more properties of the formation comprise instructions to invert the obtained electromagnetic signals based, at least in part, on the background electromagnetic fields, the body-to-receiver Green's functions, and the inhomogeneous anomalous conductivity model.

* * * * *